Patented Aug. 31, 1948

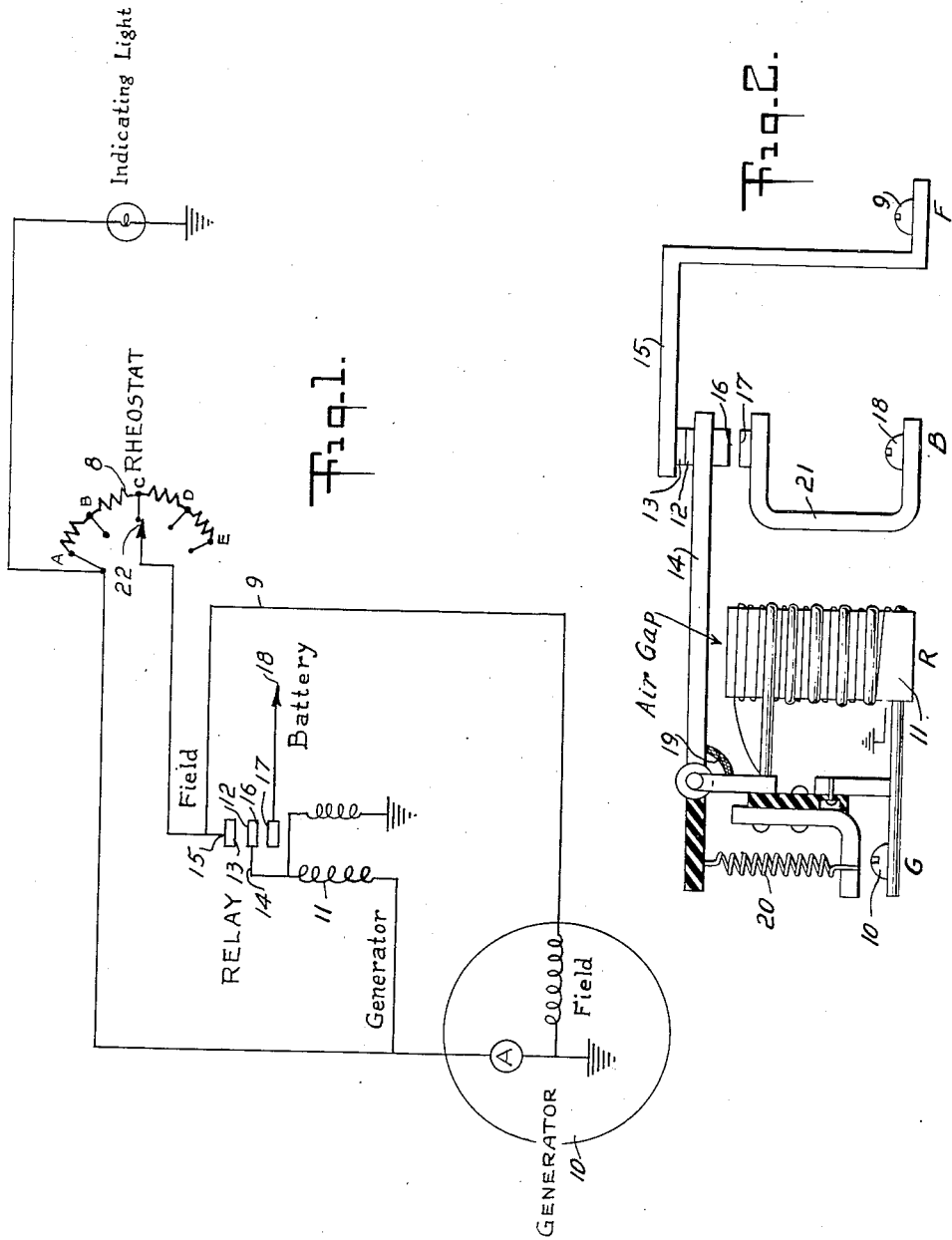

2,448,068

UNITED STATES PATENT OFFICE 2,448,068

APPARATUS FOR ELECTRIC GENERATOR CURRENT CONTROL AND VOLTAGE REGULATION

Harold Edmund Merrifield, Stemmers Run, Md.

Application April 29, 1946, Serial No. 665,684

3 Claims. (Cl. 322—83)

The present invention relates in general to the provision of novel means of automatically controlling the output of current delivered by low voltage direct current generators, at the will of the operator. The features of invention are particularly applicable to current control and voltage regulation of low voltage generators, such as are used on gasoline, gas and Diesel engines, and wind chargers, in connection with storage batteries, as well as being especially adapted to the control of any direct current generator used for the charging of storage batteries.

More particularly the invention relates to a combination of a reverse current relay or circuit breaker, with an extra set of points which are insulated away from the battery circuit closing points, and are also mounted in such manner as to open and close in opposite succession to the battery circuit closing points of the reverse current relay, and also with a variable resistor together with a mode of wiring which permits the generator shunt field to be closed out of series with the variable resistor, when the generator is not operating and to stay so closed until the shunt field has built up and the generator has commenced to deliver current, at which time the extra set of points which are insulated away from the battery circuit open, putting the variable resistor in series with the shunt field.

Direct current generators when operating as heretofore with a high resistance in the shunt field circuit, so as to deliver a low rate of generator output to a storage battery, will not build up after having been shut down, unless the high resistance is removed from the shunt field circuit until such time as the shunt field has been able to build up. Furthermore, after the shunt field, which must be built up before current will flow, has been built up again it is necessary to again restore to the shunt field the high resistance which was removed to enable it to build up, in order to again deliver the same rate of charge as was being delivered prior to the stoppage of the generator.

An object and advantage of the invention is also to allow the operator to preselect a storage battery charging rate so that when the generator is stopped and restarted the generator will automatically commence to charge the storage battery at the same rate as before the stoppage. Heretofore, in the case of restarting a generator in which an extremely low rate of charge had been selected by the operator prior to the stoppage of the generator, there has been no other way of automatically allowing the generator shunt field to build up and still have the same battery charging rate as before the stoppage of the generator, but instead manual manipulation for elimination of the shunt field resistance, until the shunt field has been built up, has been required for the purpose.

It is also an object of the invention to provide a means to supply as nearly as possible a constant battery charging rate regardless of the condition of the storage battery. It is also an object of the invention to supply a means of controlling the charging rate of the storage battery so that in cases of equipment running over long periods of time the operator can select a very low charging rate for the storage battery which will be the same after a shut down, as in the case of automatic stopping and starting, or for instance, with generators driven with power which are automatically started and stopped or which are started and stopped by remote control.

Further objects and advantages of the invention are the provision of a new and improved and greatly simplified current control and voltage regulator, which allows of fewer failures of current control than heretofore possible with prior known devices for the purpose; which permits the shunt field to build up as fast as possible, for instance as fast as the construction of the generator will permit; which allows for the adjusting of the setting or control of the rate of delivery of the current delivered by the generator, at the will of the operator. The current control and voltage regulator of the instant invention is of especial advantage in that the rate of current delivery by the generator will remain very much more constant than has heretofore been possible automatically, and in that it permits the operator to be able to pre-select the rate of current delivery, and still have the generator put out the same amount of current upon being restarted after a shut down, which is very desirable, and often very necessary, for equipment operating under abnormal conditions. With equipment operating under normal conditions the novel features of the present invention allows an operator to select the current output least damaging to the generator and storage battery, and with the least necessary load on the power plant, and also allows for trickle charging of a storage battery in use in connection with equipment running constantly, without fear of variation in the charging rate. Additionally, the control and regulator of invention enables an operator to select a very low current output rate and still allow the shunt field to build up without need of manual cutting out resistance placed in the shunt field circuit.

The invention has for further objects such other improvements and such other operative advantages or results as may be found to obtain in the processes or apparatus hereinafter described and claimed.

In the accompanying drawing forming part of this specification, there is shown for purposes of exemplification, a preferred form of apparatus in which the invention may be embodied and practised. In connection with the description of apparatus, there will be given an example of the results obtainable in the practise of the invention.

Figure 1 is a diagrammatic electrical-layout view in plan of apparatus embodying the present invention.

Figure 2 is a diagrammatic view in side elevation illustrating on a larger scale the connection of a reverse current relay or circuit breaker, with an extra set of points for the shunt field circuit, as shown in Figure 1.

As shown in Figure 1, the indicated direct current generator 10 is in connection with any direct current generator system used for purpose of charging of storage batteries, such as are used on gasoline engines, Diesel engines, gas engines and wind charges.

The direct current generator shown in Figure 1 is connected for flow of current to charge a battery by a line connection 18 between the armature of the generator 10 and the movable arm 14 and points 16, 17, of a reverse current relay or circuit breaker 11, from which points 16, 17, the current flows to the battery.

For the purpose of regulation and control of the voltage of the generator of a conventional type generator and rate of charge of the battery, a variable resistor 8 is connected in series with the shunt field 9 of the generator 10. In the form of the embodiment of the invention chosen for simplicity of illustration there is shown for the purpose a conventional form of rheostat 8 in series with the shunt field, and the armature of the generator is shown connected to the screw 10 (marked G for generator in Fig. 2) on a conventional form of reverse current relay or circuit breaker 11, to which has been added an extra set of points 12, 13, mounted one on top of the movable arm 14 of the relay for instance, as shown in Fig. 2, and the other on a rigid bar or arm 15, as shown in Fig. 2, and in such manner that the pair of points 12, 13, are in solid contact when the movable arm 14 of the relay is in a raised position. The bar or arm 14 is mounted in such manner that it has no electrical contact with the rest of the relay except at the contact points.

The lower pair of points 16, 17, which are shown in Fig. 2 are used to close the circuit between the battery 18 and the generator 10.

Throughout the drawing and illustrations and also in all written statements and claims, for simplicity of explanation, I am using a one wire system and the ground or frame of the equipment for the other side of the line.

The upper pair of points 12, 13, of the circuit breaker or relay 11, one 13 of which is located on the rigid arm or bar 15 and the other 12 on the top of the movable arm 14, are used to cut preferably simultaneously and automatically the variable resistance (rheostat) out of the shunt field circuit, and close the direct shunt field circuit between the shunt field lead through the point 13 on the rigid arm or bar 15 thence through the upper point 12 on the movable arm 14 through the movable arm to the flexible braided wire 19 to the series winding of the relay to the screw marked 10 for generator on the relay 11, thence to the shunt field through a wire connecting the screw on the relay marked 10 for generator and the shunt field lead, less all appreciable resistance other than that contained in the wiring and the upper set of points 12, 13, of the relay 11 all of which time the battery circuit 18 is broken between 16 and 17, and concurrently with the cutting in of the variable resistor 8 (rheostat) the lower point 16 on the movable arm 14 makes contact with the rigid point 17 on the bar 21 of the relay proper 11, closing the output circuit between the generator 10 and battery 18 through the screw marked 18 for battery on the relay 11 and the lead to the battery. When the movable arm 14 of the relay 11 is pulled down to close the battery circuit it also concurrently opens the direct portion of the shunt field circuit aand automatically places the variable resistor 8 (rheostat) in series with the shunt field.

In operation when the generator is started from stand still, the movable arm 14 remains in the position shown in Fig. 2, under the action of its spring 20 until the shunt field has built up and commenced to deliver current at a sufficient rate to energize the magnetic coil of the relay 11 which in turn draws the movable arm 14 of the relay down to close the output circuit between the generator 10 and the battery 18 by contact of the lower point 16 located on the movable arm 14 with the stationary point 17 located on the stationary bar 21 of the relay proper 11, on which bar 21 is located the screw marked 18 for battery, whereupon current flows from the armature through the series coil of the relay 11 and thence to the battery 18. The downward movement of the movable arm 14 concurrently breaks the contact between the upper set of points 12, 13, simultaneously opening the direct circuit portion of the shunt field circuit comprising the movable arm 14 and series coil of the relay 11 and the armature lead 9 from the generator 10, and automatically placing the variable resistor 8 in series with the shunt field. Until the time that the contact between the upper pair of points 12, 13, is broken, the shunt field circuit by-passes the variable resistor 8 (rheostat), the field flow being through the shunt field lead 9, the upper set of contact points 12, 13, movable arm 14, series coil 11 and armature lead 10. When however the shunt field has built up sufficiently to permit the generator 10 to produce current the movable arm 14 is retracted against its spring 20 and the battery circuit 18 is closed by the contact of the lower set of points 16, 17, and the variable resistor 8 (rheostat) is placed in series with the shunt field circuit and the direct portion of the shunt field circuit (that is the portion from the shunt field lead 9 to the upper relay contact point 12, through the movable arm 14 through the series coil and armature lead) is opened. Whereupon the shunt field flow is through the shunt field lead, the variable resistor (rheostat) finger, the resistor 8 and thence to the armature lead.

It will of course be understood that the extra set of points 12, 13, used in control of the shunt field can be mounted in many other mechanical ways with the same result. It will also be understood that in event of a two wire system being used, the points are used in one side only of the shunt field circuit. It will also be understood that the invention herein described is not to be limited in all its aspects to the novel use shown herein of a conventional type of relay or circuit breaker which is of especial utility in conjunction with this circuit, since it will be apparent that this shunt field control circuit can be connected in other ways and otherwise used in practical use of the circuit in the control of generator shunt fields. For example instead of mounting the extra point 13 on the rigid arm or bar 15, which is used for by-passing the variable resistor 8 (rheostat), the extra point 13 can be mounted on and through the metal cover of the conventional type of relay or circuit breaker of course keeping the point insulated away from the cover and mounted in such manner as to be rigid and to make good and sufficient contact with the point 12 on the movable arm 14 or relay 14.

In any case disregarding the method of mounting, the cutting of the variable resistor 8 in and out of the shunt field circuit takes place automatically and simultaneously with the cutting in and out of the battery circuit 18. In instances it may be desirable not to have the variable resistor 8 cut in simultaneously with the cutting in of the battery circuit 18 but to have the same take place stepwise or by means of delayed action affording an interval of time before they both are simultaneously cut in. This nevertheless may readily be made to take place with the present invention while still retaining the novel features for automatically by-passing the shunt field circuit variable resistor 8, when the battery circuit 18 is broken and for automatically cutting in the former when the circuit for the latter is closed.

From the foregoing it will be seen that the novel features of the present invention affords the operator the choice of pre-selecting a constant battery charging rate or having complete control at all times of the full range of the capacity of the generator to compensate for any change in operating conditions. Also it will be seen that the novel features of the invention affords the operator the choice of selecting a charging rate that will not change upon the driving power being shut off and the equipment put back in operation. This latter feature is especially desirable in cases of stationary equipment started and stopped manually or by remote control. These latter features are made possible only by the fact that the invention allows the generator shunt field to build up with a very high resistance in the shunt field circuit wiring system but with the resistance bypassed until such time as the shunt field has built up. After shutdown of the equipment, the variable resistor 8 (rheostat) shunt field control circuit is automatically cut out and maintained out of the shunt field circuit, while the battery circuit is broken, and until the battery circuit 18 is closed again by the flow of the required current from the generator 10. Whereupon the shunt field control circuit, containing the variable resistor 8 (rheostat) is automatically cut into shunt field. It thus will be seen that the variable resistor 8 (rheostat) may be set for delivery of a much lower rate of generator output, independently of the building up of the shunt field to the extent required for generating and delivering current, than would be possible automatically to do without this invention. It will be further seen that this shunt field control circuit is no longer limited to one that must be pre-set at a fixed setting consistent with the inherent peculiarities of the particular generator but may be reset at the will of the operator in the course of the use of the system by means readily accessible to the operator, for example by accessible means for adjusting the finger 22 of the variable resistor 8 (rheostat) relative to the rheostat contact points, as by adjustable means on an automobile instrument panel for variable resistor (rheostat) finger. In this connection one advantageous use of the instant improvement, in connection with gasoline, gas, and Diesel engine driven vehicles, is that it enables the operator to, at will, increase the resistance in the shunt field circuit and thus cut down the rate of the generator current output in the course of long trips, or sustained operation by stationary equipment, making unnecessary the burning of lights, or fear of failure of the present conventional type of regulation, to consume or regulate the excess current effectively to avoid overcharging the battery or charging the battery at too high a rate over sustained periods of time, or damaging the generator through an excessive high output rate caused by heat within the generator. It also enables an operator to re-set at will the variable resistor 8 (rheostat) at any desired higher rate desired of which the generator 10 may be capable of producing to compensate for any extra loads on the battery 8, which may be caused by excess usage of such equipment as radios, heaters, cigar lighters, extra lights, air conditioning systems, electric windshield wipers, fog lights, truck running and marker lights, bus interior and exterior lighting and radio telephones, and also excess stopping and starting. The improved features of invention are also especially applicable for regulation and control in a simple, economical and greater facile way for accurate, constant, sustained control of battery charging rates in wind charger operation, and for use in connection with Diesel electric cranes, drag lines, excavators, tractors, railroad locomotives, train lighting systems, train air conditioning systems, and all electrically started internal combustion engines.

It can be readily seen that by the use of the novel features of the invention it is possible for the operator to select the lowest rate of output necessary to keep the battery charged which in turn allows for a consequent saving of fuel in the prime mover for the reason that it takes considerable horsepower to pull a generator operating under excessive output and correspondingly less amounts of fuel with lesser loads.

The variable resistor (rheostat) and ohm range as shown in Fig. 1 is just one of the many types and kinds of variable resistors that can and may be used in conjunction with the present invention. As shown, $A-B=\frac{1}{2}$ ohm, $B-C=\frac{3}{4}$ ohm, $C-D=1$ ohm, $D-E=1\frac{1}{2}$ ohms, and the wire is 5 amp. capacity #16 wire. However, it will be readily seen that the invention is in no wise limited to any particular variable resistor, but on the contrary applies to any variable resistor capable of covering the full range of the capacity of the shunt field of the particular generator to which the instant invention is applied. Consequently, it will be readily seen that the illustration in regard to ohm variation of the variable resistor and size of wire and ampere capacity is only placed on the drawing for purposes of illustration of any of the many ways for controlling the shunt field of a direct current generator as applied to the instant invention.

The indicating light as shown in Figure 1 is used on the drawing for purposes of showing one means of allowing the operator to be able to see at a glance whether or not the generator is operating. It will be readily seen that many other indicating devices can and may be used in conjunction with the instant invention for the above purpose, for instance ammeters, voltmeters, buzzers and bells.

The invention as herein above set forth is embodied in particular form and manner but may be variously embodied within the scope of the claims hereinafter made.

I claim:

1. An automatic controlling device for a direct current generator having a shunt field, comprising a variable resistance connected in series with the shunt field, and a reverse current circuit breaker for connecting the generator to a battery to be charged, an electrical make and break switch connected in shunt with the variable resistance and operated directly by and substantially simultaneously with operation of the reverse current circuit breaker with the make and break switch closed when the reverse current circuit breaker is open, for cutting the variable resistance out of series with the shunt field when the reverse current circuit breaker opens the battery circuit, and for cutting the variable resistance back in series with the shunt field when the reverse current circuit breaker closes the battery circuit.

2. An automatic controlling device for a direct current generator having a shunt field and a circuit external to the shunt field, comprising a variable resistance connected in series with the shunt field, and a reverse current circuit breaker for connecting the generator to the external circuit, an electrical make and break switch connected so as to shunt out the variable resistance and operated directly by and substantially simultaneously with operation of the reverse current circuit breaker with the make and break switch closed whenever the reverse current circuit breaker is open, for cutting the variable resistance out of series with the shunt field when the reverse current circuit breaker opens the external circuit, and for cutting the variable resistance back in series with the shunt field whenever the reverse current breaker closes the external circuit.

3. Automatic apparatus for direct-current electric-generator current control and voltage regulation of an electrical system comprising a variable resistor, a direct current generator, an armature therefor, and a storage battery, which apparatus comprises a reverse current relay with a movable arm having a set of points for connecting the generator to the battery and having an extra set of points of sufficient current capacity to carry the shunt field load of the generator and which extra set of points are also mounted with a sufficient air gap to make good and sufficient provision for breaking the shunt field circuit, one of said extra set of points being mounted on the upper outer side of a movable arm of the relay and the other of said points being mounted in such manner that it is rigid and insulated completely away from the balance of the reverse current relay and in such rigid manner that the former point will come in solid contact with the latter point of the relay, when the movable arm is released from the pull of the magnetic coil of the reverse current relay, a terminal of sufficient electrical capacity to carry the shunt field circuit of the generator directly connected to said latter of said points, a lead from said terminal to the contact finger of the variable resistor, said variable resistor being of sufficient capacity to control the full range of the generator shunt field of the generator, another lead connected to lead from a terminal of the variable resistor and thence to the armature, another lead connected to lead from the battery terminal of the reverse current relay to the storage battery, another lead connected to lead from the shunt field of the direct current generator to the terminal which is electrically connected to the extra point that is mounted rigid and insulated completely away from the balance of the reverse current relay, and another lead connected from the generator terminal of the reverse current relay to the armature of the generator, the ground or frame of the equipment being the opposite side of the circuits.

HAROLD EDMUND MERRIFIELD.

REFERENCES CITED

The following references are of record in the file of this patent:

UNITED STATES PATENTS

| Number | Name | Date |
|---|---|---|
| 1,288,938 | Leonard | Dec. 24, 1918 |
| 2,135,977 | Leece | Nov. 8, 1938 |